(12) United States Patent
Kawabayashi et al.

(10) Patent No.: US 10,377,932 B2
(45) Date of Patent: Aug. 13, 2019

(54) SEALING RUBBER COMPOSITION AND SEAL MEMBER

(71) Applicants: JTEKT CORPORATION, Osaka-shi, Osaka (JP); KOYO SEALING TECHNO CO., LTD., Itano-gun, Tokushima (JP)

(72) Inventors: Takeshi Kawabayashi, Kashiba (JP); Fumiaki Kasahara, Kashiwara (JP); Katsuhiko Kusunoki, Itano-gun (JP)

(73) Assignees: JTEKT CORPORATION, Osaka-shi (JP); KOYO SEALING TECHNO CO., LTD., Itano-gun (JP)

( * ) Notice: Subject to any disclaimer, the term of this patent is extended or adjusted under 35 U.S.C. 154(b) by 344 days.

(21) Appl. No.: 15/223,749

(22) Filed: Jul. 29, 2016

(65) Prior Publication Data
US 2017/0051123 A1   Feb. 23, 2017

(30) Foreign Application Priority Data
Aug. 18, 2015 (JP) .................. 2015-161303

(51) Int. Cl.
| | | |
|---|---|---|
| C09K 3/10 | (2006.01) | |
| C08K 3/04 | (2006.01) | |
| F16J 15/324 | (2016.01) | |
| F16J 15/3284 | (2016.01) | |
| C08K 5/5435 | (2006.01) | |

(52) U.S. Cl.
CPC ............. *C09K 3/1006* (2013.01); *C08K 3/04* (2013.01); *C08K 5/5435* (2013.01); *F16J 15/324* (2013.01); *F16J 15/3284* (2013.01); *C08K 2201/005* (2013.01)

(58) Field of Classification Search
CPC .... F16J 15/162; F16J 15/3204; F16J 15/3232; F16J 15/3284; C08K 3/013; C08K 3/04; C08K 2201/005; C08L 13/00; C08F 220/18
See application file for complete search history.

(56) References Cited

U.S. PATENT DOCUMENTS

| | | | |
|---|---|---|---|
| 6,513,811 B1 * | 2/2003 | Bivens ................ | F16F 9/0218 188/322.18 |
| 6,572,269 B2 * | 6/2003 | Yabe .................. | F16C 29/0609 384/15 |
| 6,726,219 B2 * | 4/2004 | Bivens ................ | F16F 9/0218 188/322.18 |
| 7,459,495 B2 * | 12/2008 | Kubota ................ | C08K 3/36 524/439 |
| 9,103,444 B2 * | 8/2015 | Sato .................... | C08K 3/04 |
| 9,228,153 B2 * | 1/2016 | Kunieda .............. | C08G 18/3206 |
| 9,488,255 B2 * | 11/2016 | Ishizaki .............. | F16H 25/2418 |
| 10,189,992 B2 * | 1/2019 | Sasaki ................ | C08L 81/06 |
| 2002/0061961 A1 * | 5/2002 | Yabe .................... | C08K 3/04 524/827 |
| 2002/0154838 A1 * | 10/2002 | Yabe .................. | F16C 29/0609 384/15 |

(Continued)

FOREIGN PATENT DOCUMENTS

| | | |
|---|---|---|
| JP | 2001-348460 A | 12/2001 |
| JP | 2002-129183 A | 5/2002 |
| WO | 2013/111643 A1 | 8/2013 |

*Primary Examiner* — Nicholas L Foster
(74) *Attorney, Agent, or Firm* — Oliff PLC

(57) ABSTRACT

A sealing rubber composition includes acrylic rubber, artificial graphite, and coupling agent.

2 Claims, 3 Drawing Sheets

(56) References Cited

U.S. PATENT DOCUMENTS

| | | | |
|---|---|---|---|
| 2002/0167133 A1* | 11/2002 | Bivens | F16F 9/0218 277/436 |
| 2003/0111798 A1* | 6/2003 | Yanagiguchi | B29C 43/006 277/500 |
| 2004/0179757 A1* | 9/2004 | Yabe | C08K 3/04 384/7 |
| 2006/0167159 A1* | 7/2006 | Kubota | C08K 3/36 524/439 |
| 2007/0052126 A1* | 3/2007 | Chiba | B29C 43/003 264/109 |
| 2009/0067874 A1* | 3/2009 | Hoshio | G03G 15/0225 399/100 |
| 2011/0098403 A1* | 4/2011 | Sato | C08K 3/04 524/556 |
| 2012/0091624 A1* | 4/2012 | Sato | C08K 3/04 264/236 |
| 2014/0106995 A1* | 4/2014 | Kunieda | C08G 18/3206 508/128 |
| 2014/0203520 A1* | 7/2014 | Yamanaka | F04D 29/106 277/549 |
| 2015/0014941 A1 | 1/2015 | Yanagiguchi et al. | |
| 2015/0035235 A1* | 2/2015 | Tsuda | C08L 13/00 277/549 |
| 2015/0035236 A1* | 2/2015 | Tsuda | C08L 33/08 277/549 |
| 2015/0114156 A1* | 4/2015 | Ishizaki | F16H 25/2418 74/424.82 |
| 2016/0102205 A1* | 4/2016 | Sasaki | C08L 81/06 277/500 |

* cited by examiner

SEALING RUBBER COMPOSITION AND SEAL MEMBER

INCORPORATION BY REFERENCE

The disclosure of Japanese Patent Application No. 2015-161303 filed on Aug. 18, 2015 including the specification, drawings and abstract is incorporated herein by reference in its entirety.

BACKGROUND OF THE INVENTION

1. Field of the Invention

The present invention relates to a sealing rubber composition, which is a material for forming a seal member such as an oil seal, and a seal member which is formed of the sealing rubber composition.

2. Description of Related Art

For example, an oil seal as a seal member is used to separate an internal space from an external space at a penetration portion through which a rotary shaft penetrates, and to provide sealing to prevent oil provided in the internal space from leaking to the external space, or to prevent dust and the like from entering the internal space from the external space, that is, an oil seal is used to provide sealing between the internal space and the external space. For example, in most components of a vehicle such as a transmission and a differential gear, an oil seal is used in order to seal a rotary shaft.

An oil seal is formed in a ring shape having a ring-shaped sliding surface which contacts an outer peripheral surface of a rotary shaft over the entire circumference, due to a tightening force applied from the outside in a radial direction. In order to reduce the contact width between the sliding surface and the outer peripheral surface to reduce a running torque of a rotary shaft, in general, the sliding surface is formed in a ridge shape protruding inward in a radial direction, and plural ribs are further provided on the ridge-shaped sliding surface at equal intervals in the radial direction.

As the material for forming the oil seal, for example, various rubbers are used. A rubber oil seal can be manufactured by mixing rubber with, for example, a vulcanizing agent for vulcanizing the rubber as necessary to prepare a sealing rubber composition, forming the sealing rubber composition into a predetermined three-dimensional shape, and vulcanizing the rubber. Recently, in order to meet the demand for further reducing the fuel consumption of vehicles, particularly with regard to an oil seal for a vehicle, it has been required to further reduce a running torque, which is generated when an oil seal slides on an outer peripheral surface of a rotary shaft along with the rotation of the rotary shaft, while maintaining satisfactory sealing properties with respect to the rotary shaft, that is, it has been required to make the friction lower than that in existing techniques.

As a method of reducing the friction of a rubber member such as a seal member, for example, a method of mixing a sealing rubber composition, which is a base of the rubber member, with a solid lubricant such as graphite, molybdenum disulfide, or polytetrafluoroethylene is known (for example, refer to Japanese Patent Application Publication No. 2001-348460 (JP 2001-348460 A), Japanese Patent Application Publication No. 2002-129183 (JP 2002-129183 A), and WO2013/111643 A1).

However, the solid lubricant exhibits self-lubricating characteristics only in a poor lubrication state in which, for example, oil runs out. On the other hand, in particular, an oil seal is constantly used in a good lubrication state obtained by a large amount of oil being sealed in the internal space. Therefore, when the sealing rubber composition which is a base of the oil seal is mixed with the solid lubricant, further reduction in the friction cannot be realized.

In addition, the solid lubricant easily becomes worn. Therefore, for example, in the case of an oil seal, the sliding surface is likely to wear when sliding on the outer peripheral surface of the rotary shaft. When the wear amount increases, a tightening force of the sliding surface applied to the outer peripheral surface is likely to decrease and sealing properties are likely to be lost, ribs and a distal end of a ridge which form the sliding surface are likely to wear, the contact area between the sliding surface and the outer peripheral surface is likely to increase, and the friction is likely to increase. When the friction increases, a running torque increases and an increase in the temperature of the seal member increases, and thus the rubber is likely to deteriorate due to thermal aging at an early stage, and a squealing noise is likely to be generated due to the stick-slip phenomenon between the rubber and metal.

SUMMARY OF THE INVENTION

The invention provide: a sealing rubber composition used to form a seal member that is capable of making the friction lower than that in existing techniques while maintaining satisfactory sealing properties and capable of reducing the possibility that sealing properties are lost and the friction is increased due to wearing caused by sliding; and a seal member in which at least a sliding surface is formed of the sealing rubber composition.

A first aspect of the invention relates to a sealing rubber composition including acrylic rubber; artificial graphite; and a coupling agent.

A second aspect of the invention relates to a seal member including a sliding surface against another member. At least the sliding surface is formed of the sealing rubber composition according to the first aspect of the invention.

According to the first and second aspects of the invention, the sliding surface of the seal member is formed of the sealing rubber composition including the artificial graphite. As a result, protrusions formed of the artificial graphite are formed on the sliding surface, and thus the contact area between the sliding surface and a surface of another member can be significantly reduced. The artificial graphite is bulky and is manufactured by firing a coke formed of petroleum, coal, or the like and graphitizing the coke at a high temperature. In addition, the artificial graphite has higher hardness than other graphites which are typically used as the above-described solid lubricant, for example, flaky graphite, scaly graphite, amorphous graphite, expansive graphite, and expanded graphite. Therefore, it is possible to suppress wearing of the protrusions formed of the artificial graphite during sliding, and to favorably maintain a state where the contact area is small.

Further, the artificial graphite can be favorably bonded to the acrylic rubber through the coupling agent. Therefore, it is possible to suppress falling of the protrusions formed of the artificial graphite during sliding, and to more favorably maintain a state where the contact area is small. Due to this bonding, deterioration in physical properties of rubber such as the tensile strength and elongation of vulcanized acrylic rubber can be suppressed, and satisfactory rubber physical properties can be maintained.

Furthermore, due to the addition of the artificial graphite, the wear resistance of the sliding surface itself can be improved. Therefore, for example, in a case where the seal member is an oil seal, it is possible to reduce the possibility that a tightening force decreases due to wearing of the sliding surface, and thus sealing properties are lost; the possibility that the contact area between the sliding surface and the outer peripheral surface increases, the friction increases, and thus the running torque increases; the possibility that an increase in the temperature of the seal member increases significantly, and thus the rubber deteriorates due to thermal aging at an early stage; and the possibility that a squealing noise is generated due to the stick-slip phenomenon between the rubber and metal.

Accordingly, according to the first and second aspects of the invention, it is possible to provide a sealing rubber composition used to form a seal member that is capable of making the friction lower than that in existing techniques while maintaining satisfactory sealing properties and capable of reducing the possibility that sealing properties are lost and the friction is increased due to wearing caused by sliding; and a seal member in which at least a sliding surface is formed of the sealing rubber composition.

The acrylic rubber may be carboxylated acrylic rubber.

According to the above-described configuration, as the acrylic rubber, carboxylated acrylic rubber, which is highly reactive with the coupling agent such as a silane coupling agent, is used. As a result, the artificial graphite and the acrylic rubber can be bonded to each other through the coupling agent more favorably and more strongly, and the durability of the seal member can be further improved.

An average particle size of the artificial graphite may be 5 μm to 50 μm.

With the above-described configuration, the average particle size of the artificial graphite is set to be in a range of 5 μm to 50 μm, and thus, while oil leakage is prevented by maintaining satisfactory sealing properties of the sliding surface, the contact area between the sliding surface and a surface of another member can be reduced due to the protrusions formed of the artificial graphite, thereby reducing the friction.

An addition amount of the artificial graphite may be 5 parts by mass to 40 parts by mass with respect to 100 parts by mass of the acrylic rubber.

With the above-described configuration, the addition amount of the artificial graphite is set to be in a range of 5 parts by mass to 40 parts by mass with respect to 100 parts by mass of the acrylic rubber, and thus, while satisfactory physical properties of the seal member formed of the rubber are maintained, the contact area between the sliding surface and a surface of another member can be reduced due to the protrusions formed of the artificial graphite, thereby reducing the friction.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1A:
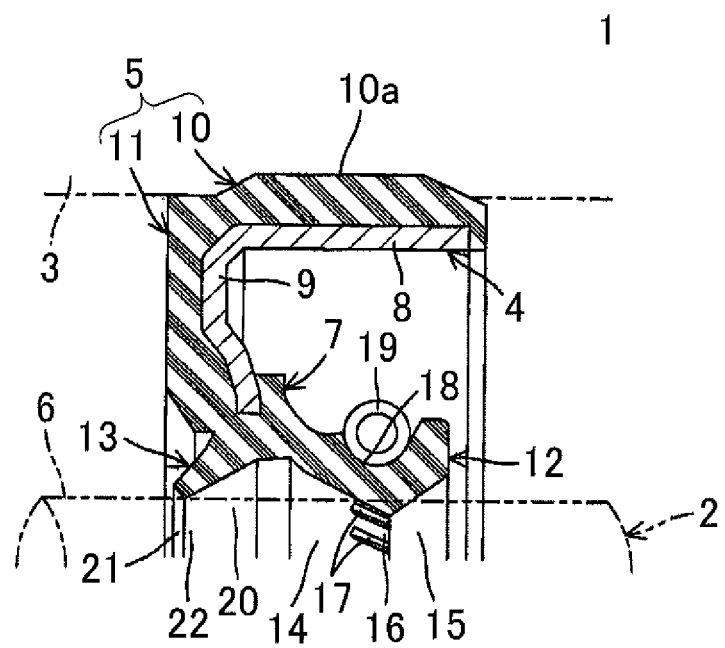
FIG. 1A is a sectional view showing an oil seal that is an example of a seal member according to an embodiment of the invention.
Figure 1B:
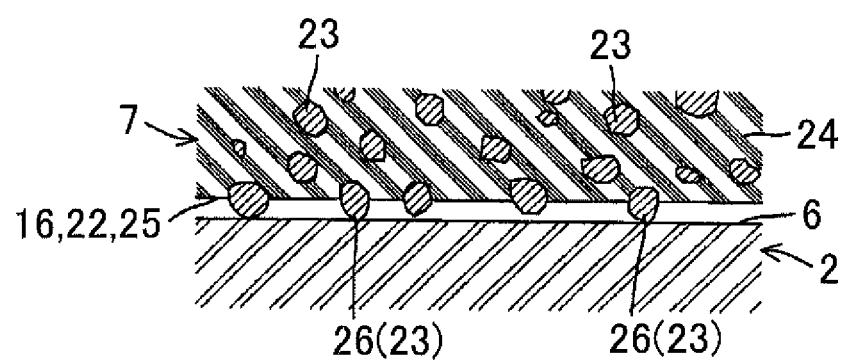
FIG. 1B is an enlarged sectional view showing a sliding surface and a region near the sliding surface in the oil seal.

FIG. 1A is a sectional view showing an oil seal that is an example of a seal member according to an embodiment of the invention, and FIG. 1B is an enlarged sectional view showing a sliding surface and a region near the sliding surface in the oil seal. Referring to FIG. 1A, an oil seal 1 according to this example provides sealing between a rotary shaft 2, which is an example of "another member" according to the invention, and a ring-shaped surrounding member 3 surrounding the rotary shaft 2. This oil seal 1 includes a ring-shaped seal body 5 and a ring-shaped seal lip 7. The seal body 5 includes a ring-shaped core 4, is fitted to the surrounding member 3, and is integrally formed of rubber as a whole.

Among the components, the core 4 includes a tubular portion 8 that is integrally formed of metal as a whole and is provided concentrically with the surrounding member 3 in a fitted state shown in the drawing; and an inner flange portion 9 having a substantially porous disc shape which extends inward in a radial direction from an end portion of the tubular portion 8 on the left side in the drawing, and into which the rotary shaft 2 is inserted. The seal body 5 includes an external tubular portion 10 that covers an outer peripheral surface of the tubular portion 8 of the core 4; and an external plate portion 11 that is continuous with the external tubular portion 10 and covers a side surface of the inner flange portion 9 on the left side in the drawing.

The external tubular portion 10 includes a swelling portion 10a provided in a center portion of the external tubular portion 10 in the axial direction. The swelling portion 10a has a swelling shape and has an outer diameter slightly larger than the inner diameter of the surrounding member 3. As a result, the seal body 5 can be fitted to the surrounding member 3. The swelling portion 10a is formed such that the thickness is constant over the entire circumference of the swelling portion 10a. As a result, the tubular portion 8 of the core 4 is provided concentrically with the surrounding member 3 when the seal body 5 is fitted to the surrounding member 3.

The external plate portion 11 extends to a radially inner end portion of the inner flange portion 9 of the core 4. The ring-shaped seal lip 7 is continuous with, and is integrated with the external plate portion 11 to extend from the radially inner end portion of the inner flange portion 9 toward a further inner side in the radial direction. The seal lip 7 includes: a main lip portion 12 that is provided further inward in the radial direction with respect to a radially inner end portion of the external plate portion 11 and extends to the right in the drawing to contact the outer peripheral surface 6 of the rotary shaft 2; and an auxiliary lip portion 13 having a substantially plate-shaped section that is provided inward in the radial direction with respect to an inner periphery of a proximal portion of the main lip portion 12 on the seal body 5-side and extends to the left in the drawing to contact the outer peripheral surface 6 of the rotary shaft 2.

In particular, in an inner periphery of the main lip portion 12 on a distal end side, a tapered surface 14 whose inner diameter gradually decreases from the proximal end side to the distal end side of the main lip portion 12 and a tapered surface 15 whose inner diameter gradually decreases from the distal end side to the proximal end side of the main lip portion 12 are provided. A sliding surface 16 contacting the outer peripheral surface 6 of the rotary shaft 2 is provided at and in the vicinity of a ridge which protrudes inward in the radial direction between the two tapered surfaces 14, 15, and plural ribs 17 are provided on the sliding surface 16 at equal intervals in the radial direction.

In an outer periphery of the main lip portion 12, a ring-shaped recessed groove 18 is provided on a back surface side with respect to the sliding surface 16 to extend over the entire circumference, and a backup ring 19 that restricts the outward deformation of the main lip portion 12 in the radial direction is fitted to the recessed groove 18. In an inner periphery of the auxiliary lip portion 13, a tapered surface 20 whose inner diameter gradually decreases from the proximal end side to the distal end side of the auxiliary lip portion 13 is provided, and a sliding surface 22 contacting the outer peripheral surface 6 of the rotary shaft 2 is provided at and in the vicinity of a ridge which protrudes inward in the radial direction between the tapered surface 20 and a distal end surface 21 of the auxiliary lip portion 13.

Referring to FIGS. 1A and 1B, the seal body 5 and the seal lip 7 are integrally formed of a vulcanizate of a sealing rubber composition 24 according to the invention including acrylic rubber, artificial graphite 23, and a coupling agent as a whole. Portions of the artificial graphite 23 included in the sealing rubber composition 24 protrude from the sliding surface 16 of the main lip portion 12, the sliding surface 22 of the auxiliary lip portion 13, and a sliding surface 25 that is an external surface of each rib 17, so as to form plural protrusions 26 on the sliding surfaces 16, 22, 25.

As a result, the contact area between the sliding surfaces 16, 22, 25 and the outer peripheral surface 6 of the rotary shaft 2 can be significantly reduced, and thus the running torque of the rotary shaft 2 can be reduced. As the acrylic rubber, for example, various kinds of acrylic rubber such as carboxylated acrylic rubber, epoxy acrylic rubber, and active chlorine acrylic rubber can be used. Among them, carboxylated acrylic rubber is preferable.

The carboxylated acrylic rubber is highly reactive with the coupling agent such as a silane coupling agent and is bonded to the artificial graphite 23 through the coupling agent more favorably and more strongly. Therefore, the durability of the seal member can be further improved. As the coupling agent, for example, various coupling agents such as a silane coupling agent and a titanate coupling agent, which can be favorably bonded to both of the artificial graphite 23 and the acrylic rubber, can be used.

In particular, a silane coupling agent having high bondability with the carboxylated acrylic rubber is preferable. Examples of the silane coupling agent include various silane coupling agents having, in the molecules, a group having high bondability with the graphite such as a methoxy group, an ethoxy group, or an acetoxy group, and a group having high bondability with the acrylic rubber such as an amino group, an epoxy group, a methacryl group, a vinyl group, or a mercapto group.

The addition amount of the silane coupling agent can be set to any amount. However, the addition amount of the silane coupling agent is preferably 0.5 parts by mass or more and is preferably 5 parts by mass or less and more preferably 2 parts by mass or less with respect to 100 parts by mass of the acrylic rubber. As the artificial graphite 23, various bulky artificial graphites can be used which are manufactured by firing a coke formed of petroleum, coal, or the like and graphitizing the coke at a high temperature of, for example, 2500° C. or higher.

The average particle size of the artificial graphite 23 is preferably 5 μm or more and is preferably 50 μm or less. When the average particle size of the artificial graphite 23 is less than 5 μm, the height of the protrusions 26 formed on the sliding surfaces 16, 22, 25 using the artificial graphite 23 is insufficient. Therefore, an effect of the protrusions 26 reducing the friction may not be sufficiently obtained.

On the other hand, in a case where the average particle size of the artificial graphite 23 is more than 50 μm, the size of the formed protrusions 26 is excessively large and, for example, is close to the contact width (typically, set to approximately 100 μm) between the sliding surfaces 16, 22 and the sliding surface 25 of the rib 17, which are formed in a ridge shape, and the outer peripheral surface 6 of the rotary shaft 2. Therefore, the sealing properties of the sliding surfaces 16, 22, 25 may deteriorate, and oil is likely to leak. In contrast, by controlling the average particle size of the artificial graphite 23 to be in the above-described range, while oil leakage is prevented by maintaining satisfactory (appropriate) sealing properties on the sliding surfaces 16, 22, 25, the contact area between the sliding surfaces 16, 22, 25 and the outer peripheral surface 6 of the rotary shaft 2, which is an example of "another member" according to the invention, can be reduced due to the protrusions 26 formed of the artificial graphite 23, thereby reducing the friction.

In the invention, the average particle size of the artificial graphite 23 is expressed as a value measured using a laser diffraction method. The addition amount of the artificial graphite 23 is preferably 5 parts by mass or more and is 40 parts by mass or less with respect to 100 parts by mass of the acrylic rubber. When the addition amount of the artificial graphite 23 is less than 5 parts by mass, the number of the protrusions 26 formed on the sliding surfaces 16, 22, 25 using the artificial graphite 23 is insufficient. Therefore, an effect of the protrusions 26 reducing the friction may not be sufficiently obtained.

On the other hand, even when the addition amount of the artificial graphite 23 is more than 40 parts by mass, the effect cannot be further improved, and physical properties of rubber such as tensile strength or elongation deteriorate due to a relatively insufficient amount of rubber. Therefore, the vulcanized rubber is hard and embrittled, and thus the seal torque is likely to increase, damages are likely to be generated, for example, when the rubber composition is formed into a three-dimensional shape including the seal body 5 and the seal lip 7 and is released from a mold after vulcanized, or cracks are likely to be formed when the oil seal 1 is used.

In contrast, by controlling the addition amount of the artificial graphite 23 to be in the above-described range, while satisfactory (appropriate) physical properties of the seal member formed of rubber are maintained, the contact area between the sliding surfaces 16, 22, 25 and the outer peripheral surface 6 of the rotary shaft 2, which is an example of "another member" according to the invention, can be reduced due to the protrusions 26 formed of the artificial graphite 23, thereby reducing the friction. In addition to the artificial graphite 23 and the coupling agent, a vulcanizing agent for vulcanizing the acrylic rubber, a vulcanization accelerator, and various additives such as a lubricant, a mold release agent, an age inhibitor, a reinforcing agent, a plasticizer, or a processing aid may be added to the sealing rubber composition 24 in appropriate addition amounts.

The configuration of the invention is not limited to the above-described example shown in the drawings. For example, in the drawing shown in the drawings, the whole body including the seal body 5 and the seal lip 7 is formed using the sealing rubber composition 24 according to the invention including the artificial graphite 23. However, at least only the sliding surfaces 16, 22, 25 and regions near the sliding surfaces 16, 22, 25 may be formed using the sealing rubber composition 24, and the other regions may be formed using a rubber composition that does not include the artificial graphite 23.

The configuration of the invention can be applied to oil seals having various forms other than the form of the example shown in the drawings. Moreover, the configuration of the invention is not limited to the oil seal. For example, the configuration of the invention is applicable to various seal members such as a contact type bearing seal or a dust seal, and the configuration of the invention may be applied to a seal member in a fixed portion.

Hereinafter, the invention will be described based on the following test examples. However, the configuration of the invention is not limited to these test examples. Hereinafter, Test Example 1 will be described. To carboxylated acrylic rubber, artificial graphite having an average particle size of 35 μm, an epoxy silane coupling agent, and components shown in Table 1 below were added in addition amounts shown in Table 1 to prepare a sealing rubber composition.

TABLE 1

| Component | Kind | Part(s) by Mass |
|---|---|---|
| Rubber | Carboxylated Acrylic Rubber | 100 |
| Graphite | Artificial Graphite (Average Particle Size: 35 μm) | 35 |
| Coupling Agent | Epoxy Silane Coupling Agent | 1 |
| Vulcanizing Agent | Hexadiamine Carbamate | 1.25 |
| Vulcanization Accelerator | Organic Amine | 2.0 |
| Lubricant | Stearic Acid | 2 |
| Mold Release Agent | Microcrystalline Wax | 1 |
| Age Inhibitor | Age Inhibitor CD | 2 |
| Reinforcing Agent | Carbon Black FEF | 30 |
| Reinforcing Agent | Silica | 35 |
| Plasticizer | Polyol Ester Plasticizer | 3 |
| Processing Aid | Fatty Acid Ester Wax | 1 |

For comparison, a sealing rubber composition, to which only the epoxy silane coupling agent among the above-described components was not added, was prepared (i.e., a sealing rubber composition was prepared by using the above-described components excluding only the epoxy silane coupling agent). Each of the two sealing rubber compositions was formed into a sheet shape and then was punched after vulcanizing the rubber. As a result, dumbbell-shaped test pieces were prepared. The tensile strengths (MPa) of the test pieces were obtained by performing a tensile test according to a measurement method described in JIS K 6251:2010 "Rubber, vulcanized or thermoplastics—Determination of tensile stress-strain properties". The results are shown in FIG. 2.

Figure 2:
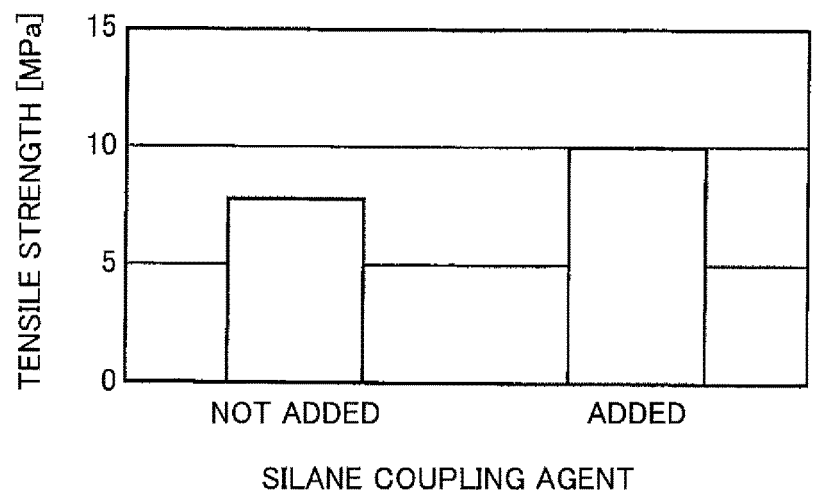
FIG. 2 is a graph showing an example of the results of determining a relationship between whether or not a coupling agent is added and a tensile strength (MPa) of a vulcanized rubber.

It was found from FIG. 2 that, by adding the coupling agent, the bond strength between the acrylic rubber and the artificial graphite can be improved as compared to a case where the coupling agent is not added and physical properties of rubber in the oil seal, which is formed of a vulcanizate of the sealing rubber composition, can be improved.

Hereinafter, Test Example 2 will be described. The oil seal 1 having a three-dimensional shape shown in FIG. 1A, which included the seal body 5 and the seal lip 7, was prepared using each of the following sealing rubber compositions including: the same sealing rubber composition as in Test Example 1 which was prepared using 35 parts by mass of the artificial graphite having an average particle size of 35 μm and 1 part by mass of the epoxy silane coupling agent; sealing rubber compositions which were prepared by respectively adding scaly graphite, amorphous graphite, and spheroidal graphite in the same amount instead of the artificial graphite; and a sealing rubber composition which was prepared without adding the artificial graphite.

Figure 3:
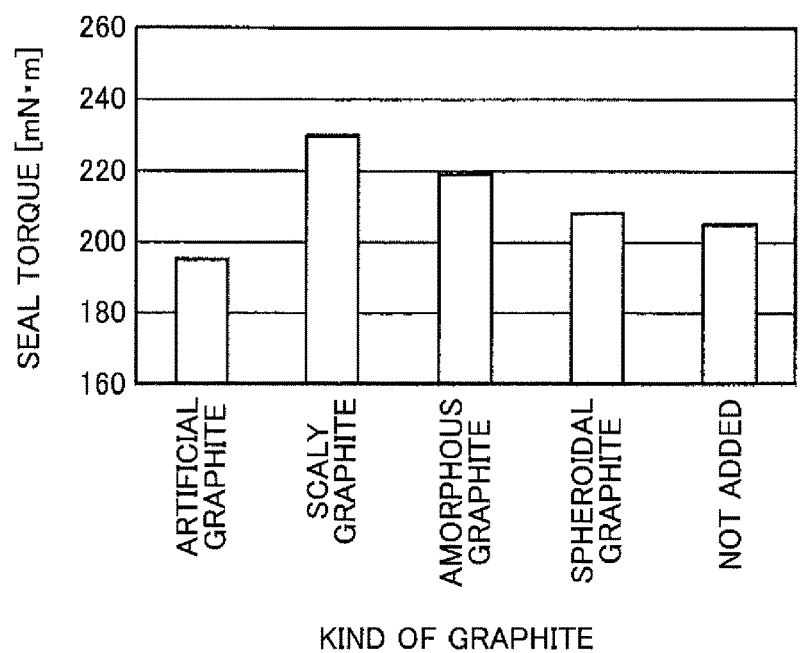
FIG. 3 is a graph showing an example of the results of determining a relationship between whether or not graphite is added and the kind of graphite added, and a seal torque (mN·m) of an oil seal, which is an index indicating reduction in the friction.

The rotary shaft 2 was inserted into each of the oil seals 1, the rotary shaft 2 was rotated for 30 minutes for break-in rotation (i.e., break-in operation), and then the seal torque (mN·m) thereof as an index indicating reduction in the friction was measured. The results are shown in FIG. 3. The initial value of the seal torque before the break-in rotation was 205 mN·m. It was found from FIG. 3 that, in cases where the scaly graphite, the amorphous graphite, and spheroidal graphite which are so-called solid lubricants were added respectively, the seal torque increased due to the break-in rotation as compared to a case where graphite was not added (not added). As described above, the reason for this is the wearing of graphite.

In contrast, it was found that, in a case where the artificial graphite was added, the seal torque significantly decreased due to the break-in rotation as compared to a case where graphite was not added and that the friction of the oil seal can be reduced due to the addition of the artificial graphite as compared to a usual case (i.e., a case where graphite is not added).

Hereinafter, Test Example 3 will be described. The oil seal 1 having a three-dimensional shape shown in FIG. 1A, which included the seal body 5 and the seal lip 7, was prepared using each of the following sealing rubber compositions including: the same sealing rubber composition as in Test Example 1 which was prepared using 35 parts by mass of the artificial graphite having an average particle size of 35 μm and 1 part by mass of the epoxy silane coupling agent; and sealing rubber compositions which were prepared by respectively adding artificial graphites having average particle sizes of 8 μm, 25 μm, and 50 μm in the same amount instead of the artificial graphite.

Figure 4:
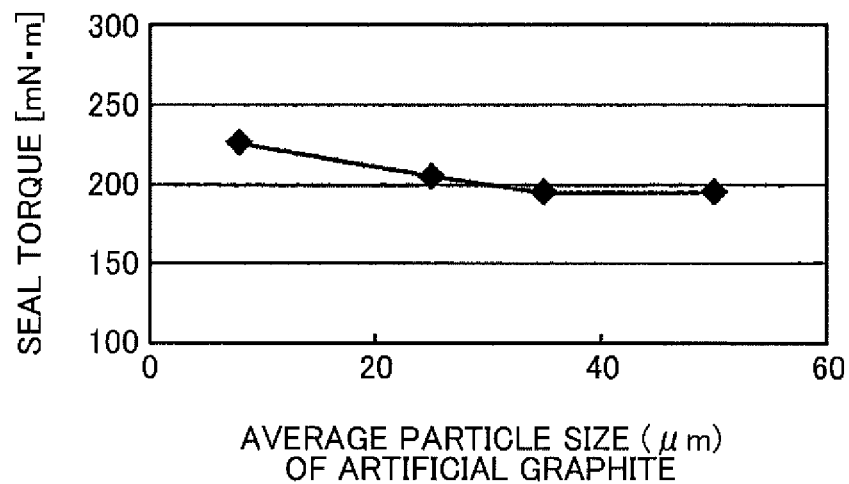
FIG. 4 is a graph showing an example of the results of determining a relationship between an average particle size (μm) of artificial graphite and a seal torque (mN·m) of an oil seal.

The rotary shaft 2 was inserted into each of the oil seals 1, the rotary shaft 2 was rotated for 30 minutes for break-in rotation (i.e., break-in operation), and then the seal torque (mN·m) thereof was measured. The results are shown in FIG. 4. It was found from FIG. 4 that, from the viewpoint of the effect of reducing the friction by the addition of artificial graphite, the average particle size of the artificial graphite is preferably 5 μm or more and is preferably 50 μm or less.

Hereinafter, Test Example 4 will be described. The oil seal 1 having a three-dimensional shape shown in FIG. 1A, which included the seal body 5 and the seal lip 7, was prepared using each of the following sealing rubber compositions including: the same sealing rubber composition as in Test Example 1 which was prepared using 35 parts by mass of the artificial graphite having an average particle size of 35 μm and 1 part by mass of the epoxy silane coupling agent; and sealing rubber compositions which were prepared by respectively setting the addition amount of the artificial graphite to 5 parts by mass, 20 parts by mass, and 50 parts by mass.

Figure 5:
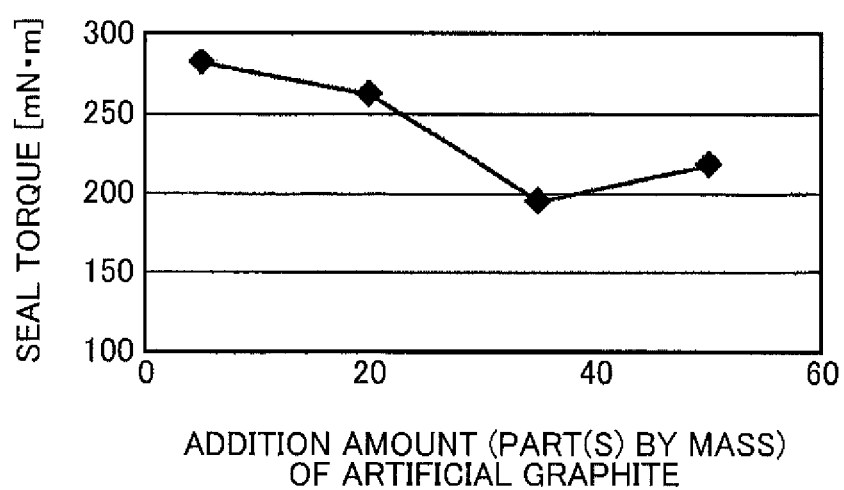
FIG. 5 is a graph showing an example of the results of determining a relationship between an addition amount (part(s) by mass) of artificial graphite with respect to 100 parts by mass of acrylic rubber and a seal torque (mN·m) of an oil seal.

The rotary shaft 2 was inserted into each of the oil seals 1, the rotary shaft 2 was rotated for 30 minutes for break-in rotation (i.e., break-in operation), and then the seal torque (mN·m) thereof was measured. The results are shown in FIG. 5. It was found from FIG. 5 that, from the viewpoint of the effect of reducing the friction by the addition of artificial graphite, the addition amount of the artificial graphite is preferably 5 parts by mass or more. In a case where the addition amount of the artificial graphite was 50 parts by mass, the seal torque tended to increase as compared to the addition amount of the artificial graphite was 35 parts by mass. It was found that the oil seal 1, which was prepared by setting the addition amount of the artificial graphite to 50 parts by mass, was hard and embrittled when actually observed. Accordingly, it was found that the addition amount of the artificial graphite is preferably 40 parts by mass or less.

What is claimed is:

1. A sealing rubber composition for forming a sliding surface of a seal member for sliding against another member, comprising:
   100 parts by mass of a carboxylated acrylic rubber;
   5 to 40 parts by mass of an artificial graphite formed by firing a coke and graphitizing the coke at a temperature of 2500° C. or higher, the artificial graphite being in the form of particles having an average overall particle size of 5 μm to 50 μm; and
   0.5 to 5 parts by mass of an epoxy silane coupling agent for aiding in bonding the acrylic rubber to the artificial graphite particles,
   wherein the artificial graphite particles form friction reducing protrusions for protruding from the sliding surface of the seal member and for contacting the another member.

2. A seal member comprising:
   a sliding surface for sliding against another member, wherein at least the sliding surface is formed of the sealing rubber composition according to claim 1, and
   wherein the friction reducing protrusions of the artificial graphite particles protrude from the sliding surface and are for contacting the another member.

* * * * *